(12) United States Patent
Peljto et al.

(10) Patent No.: US 9,298,968 B1
(45) Date of Patent: Mar. 29, 2016

(54) DIGITAL IMAGE ANALYSIS OF INFLAMMATORY CELLS AND MEDIATORS OF INFLAMMATION

(71) Applicant: Flagship Biosciences, LLC, Westminster, CO (US)

(72) Inventors: Mirza Peljto, Louisville, CO (US); Anthony J. Milici, Branford, CT (US); Holger Lange, Enger (DE); Joseph Krueger, Andover, MA (US); Famke Aeffner, Boulder, CO (US); George D. Young, Ridgway, CO (US); Nathan T. Martin, Boulder, CO (US)

(73) Assignee: FLAGSHIP BIOSCIENCES, INC., Westminster, CO (US)

( * ) Notice: Subject to any disclaimer, the term of this patent is extended or adjusted under 35 U.S.C. 154(b) by 0 days.

(21) Appl. No.: 14/588,329

(22) Filed: Dec. 31, 2014

Related U.S. Application Data

(60) Provisional application No. 62/049,954, filed on Sep. 12, 2014.

(51) Int. Cl.
*G06K 9/00* (2006.01)
*G06T 7/00* (2006.01)

(52) U.S. Cl.
CPC .......... *G06K 9/00127* (2013.01); *G06T 7/0012* (2013.01); *G06T 2207/30004* (2013.01)

(58) Field of Classification Search
CPC ................. G06T 2207/30024; G06K 9/00127
See application file for complete search history.

(56) References Cited

U.S. PATENT DOCUMENTS

| | | | | |
|---|---|---|---|---|
| 4,207,554 A * | 6/1980 | Resnick | ............. | G06K 9/00127 382/133 |
| 5,978,497 A * | 11/1999 | Lee | .................. | G01N 15/1475 382/133 |
| 6,165,734 A * | 12/2000 | Garini | ................. | C12Q 1/6841 435/14 |
| 6,581,011 B1 * | 6/2003 | Johnson | ................ | G06F 19/321 382/128 |
| 7,899,624 B2 * | 3/2011 | Cualing | ........... | G01N 33/56966 382/133 |
| 8,594,410 B2 * | 11/2013 | Schmidt | ............... | G06K 9/6253 382/128 |
| 8,693,788 B2 * | 4/2014 | Wojton | ................ | A61B 5/0013 382/133 |
| 2002/0186875 A1 * | 12/2002 | Burmer | .................... | G06K 9/66 382/133 |
| 2004/0241677 A1 * | 12/2004 | Lin | ..................... | G01N 15/1475 435/6.11 |
| 2005/0031183 A1 * | 2/2005 | Wrigglesworth | ......... | G06T 7/20 382/133 |
| 2006/0036369 A1 * | 2/2006 | Guittet | ................. | G06K 9/0014 702/19 |
| 2006/0204071 A1 * | 9/2006 | Ortyn | ..................... | G01J 3/2889 382/133 |
| 2006/0250604 A1 * | 11/2006 | Hamada | ............. | G01N 15/1459 356/39 |
| 2008/0166035 A1 * | 7/2008 | Qian | ..................... | G06T 7/0012 382/133 |
| 2008/0304733 A1 * | 12/2008 | Macaulay | .......... | G01N 33/5091 382/133 |

(Continued)

*Primary Examiner* — Avinash Yentrapati
(74) *Attorney, Agent, or Firm* — Coastal Patent Law Group, P.C.

(57) ABSTRACT

This disclosure concerns methods for evaluating inflammatory cells and modulators of the inflammatory response in tumor tissue and other relevant tissue types. The methods entail: obtaining a tissue sample and processing said tissue sample to produce histologic slides of tissue sections; staining of the tissue sections to identify inflammatory cells and modulators of the inflammatory response; digitizing slides to produce an image of the stained tissue sections; digitally stratifying the tissue sample into tumor and other relevant tissue compartments; and using digital image analysis to quantify cell-based and cell population-based features. The quantification of cell-based and cell population-based features within a tissue compartment of interest is used to develop a summary score of the immune system-tissue compartment of interest interaction. Patient stratification and selection as candidates for a therapeutic approach is ultimately based on the summary score value.

20 Claims, 15 Drawing Sheets

(56) References Cited

U.S. PATENT DOCUMENTS

| | | | |
|---|---|---|---|
| 2010/0054575 A1* | 3/2010 | Zhou | G01N 15/1459 382/134 |
| 2010/0111396 A1* | 5/2010 | Boucheron | G06K 9/0014 382/133 |
| 2010/0169811 A1* | 7/2010 | Yamada | G01N 15/1475 715/764 |
| 2010/0183216 A1* | 7/2010 | Yamada | G01N 15/1475 382/134 |
| 2010/0254589 A1* | 10/2010 | Gallagher | G06K 9/0014 382/133 |
| 2010/0284602 A1* | 11/2010 | Winkelman | G01N 1/2813 382/134 |
| 2011/0254943 A1* | 10/2011 | Ozinsky | G01N 21/6458 348/79 |
| 2012/0076390 A1* | 3/2012 | Potts | G06T 7/0014 382/133 |
| 2012/0269418 A1* | 10/2012 | McCulloch | G06K 9/00147 382/133 |
| 2013/0294676 A1* | 11/2013 | Parvin | A61B 5/0033 382/133 |
| 2014/0233826 A1* | 8/2014 | Agaian | A61B 5/7267 382/133 |
| 2014/0286561 A1* | 9/2014 | Remiszewski | G06K 9/00127 382/133 |
| 2014/0294279 A1* | 10/2014 | Madabhushi | G06T 7/0014 382/133 |
| 2014/0369587 A1* | 12/2014 | Galloway | G01N 33/5005 382/133 |
| 2014/0377753 A1* | 12/2014 | Bamford | G06T 7/0012 435/6.11 |
| 2015/0004630 A1* | 1/2015 | Lange | G01N 33/5005 435/7.21 |
| 2015/0254494 A1* | 9/2015 | Madabhushi | G06K 9/0014 382/133 |

* cited by examiner

DIGITAL IMAGE ANALYSIS OF INFLAMMATORY CELLS AND MEDIATORS OF INFLAMMATION

CROSS-REFERENCE TO RELATED APPLICATIONS

This application claims benefit of priority with U.S. Provisional Ser. No. 62/049,954, filed Sep. 12, 2014; the contents of which are hereby incorporated by reference.

BACKGROUND

1. Field of the Invention

The disclosure relates to methods for quantitative assessment of a patient-specific immune system state in tumor tissue and other relevant tissue compartments for evaluating a potential or ongoing treatment; and more particularly to such methods including analyzing inflammatory cell quantity, expression level of biomarkers or quantity of mediators of inflammation, and the distribution pattern of inflammatory cells in distinct tissue compartments within tissue samples containing tumor tissue.

2. Description of the Related Art

The role of the immune system in response to cancer treatment is becoming more evident. Research studies have shown that the localization of specific inflammatory cell types in or near tumor tissue can be a prognostic factor for an array of cancer types. Furthermore, some cancer therapies induce an inflammatory response near the tumor, and it is suggested that this response is an indicator of treatment outcome. Thus, a cursory characterization of individual populations of inflammatory cells (e.g. CD8+ and CD45RO+ cells) and modulators of the inflammatory response (e.g. cytokines and chemokines) has identified patient-specific immune system landscapes, in the context of tumor tissue, which could influence patient care.

While current evidence indicates that the immune system state in tumor tissues, as reflected by individual inflammation modulators, impacts prognosis, functional studies and current biologic models of the immune system-tumor interaction suggest that the immune system state could be predictive of patient responses to specific therapies. This paradigm suggests that an in-depth characterization of inflammatory cell subpopulations and mediators of inflammation could be used to select patients who are more likely to respond to specific therapies based on their immune system landscape. Therefore, an accurate method for profiling the quantity and distribution of inflammatory cell types and mediators of inflammation within the tumor and surrounding tissue would become necessary to stratify patients in this manner.

Manual evaluation of histologic tissue sections by a pathologist is commonly implemented to assess inflammatory cells and modulators of inflammation. The evaluation of a tissue section by a pathologist can involve determining the quantity of inflammatory cells and scoring expression levels of molecules that modulate inflammation in a tissue compartment, for example, tumor tissue or other relevant tissue types, such as stromal tissue. However, the intricate spatial relationships and the often complex distribution of inflammatory cells in tissues pose significant challenges for manual evaluation of tissue sections.

Manual evaluation of histologic tissue sections by a pathologist can be limited in several ways: (i) manual counting of inflammatory cells and determining expression levels of inflammation modulators are subjective and prone to observer bias and human error; (ii) a manual evaluation cannot practically assess a whole tissue section; (iii) quantitation of complex inflammation modulator distribution metrics (i.e. distances between cells, distances between cells and tissue features, fractal patterns, lacunarity, etc.) are not possible; and (iv) quantitative assessments of associations between one or more markers of inflammatory cell types using serial tissue sections are not possible by manual counting.

Therefore, whole slide scanning and sophisticated image analysis programs should be used to overcome many of the challenges presented by manual assessment of inflammatory cells and inflammation modulators in tissue sections. These methods will detect and characterize cells across entire tissue sections and, thus, quantitatively evaluate cells, cell subpopulations, and biomarker expression within the context of the greater tissue area. Ultimately, the inflammatory cell and inflammatory modulator landscape captured and analyzed by this approach can be used to draw inferences relevant to patient care in oncology. This paradigm will have utility for patient prognosis. Based on knowledge of the biologic mechanisms of the immune system-tumor interaction, it is likely that this paradigm can be applied to selecting patients for specific therapies and for monitoring treatment efficacy or toxicity.

Thus, there is a present and continuing need for image analysis-based systems and methods which can be used to quantitatively assess the patient-specific immune system state in tumor tissue and other relevant tissue compartments.

SUMMARY

In accordance with the embodiments herein, novel methods for examining and quantitatively assessing inflammatory cells and inflammation modulators in the context of cancer are described. These methods go far beyond the ability of human evaluation and interpretation using an optical microscope and thus are a significant improvement over current state of the art methods.

In various embodiments, the methods generally comprise: acquiring, processing, and staining a tissue section, digitalizing said tissue section to produce an image, extracting cell features with a software system, stratifying tissue into separate tissue compartments containing tumor cells or other relevant cell types (e.g. stroma) based on extracted cell features, detecting and characterizing cells within the respective tissue compartments of interest that stain above a defined threshold (i.e. positive) for an inflammatory cell type marker, utilizing values or statistics derived from the characterization of positive cells in the context of the tissue to derive an immune system state score for the tissue section, and using the score to stratify patients.

DETAILED DESCRIPTION OF EMBODIMENTS

In the following description, for purposes of explanation and not limitation, details and descriptions are set forth in order to provide a thorough understanding of the present invention. However, it will be apparent to those skilled in the art that the present invention may be practiced in other embodiments that depart from these details and descriptions without departing from the spirit and scope of the invention.

Figure 1:
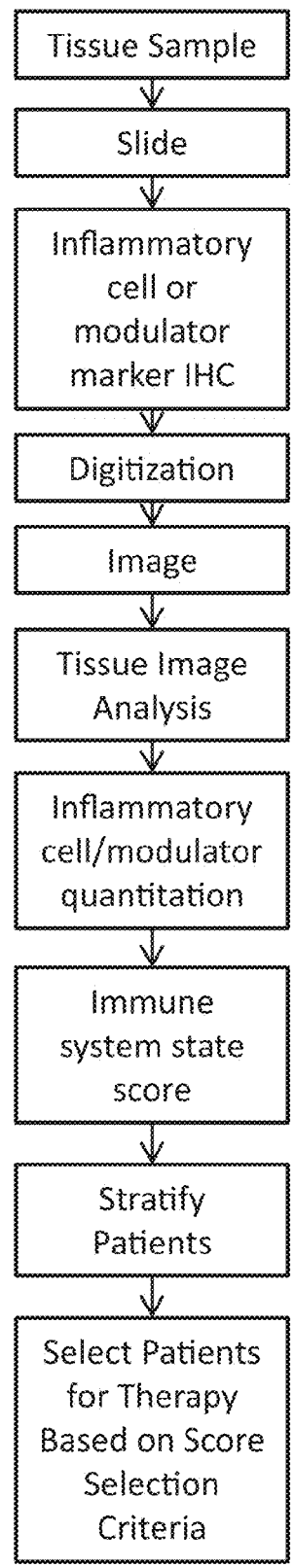
FIG. 1 shows a method for quantitative assessment of a patient-specific immune system state in tumor tissue and other relevant tissue compartments for evaluating a potential or ongoing treatment.

In an embodiment as illustrated in FIG. 1, a method analyzing inflammatory cells and mediators of inflammation in biological tissue sections containing cancerous lesions may generally comprise: (i) tissue acquisition, preparation, and embedding; (ii) slide preparation; (iii) immunohistochemical staining for cells, inflammatory cells, and/or modulators of the inflammatory response; (iv) digitization of the slide to produce an image; (v) tissue image analysis and extraction of cell-based features by a software system which are saved to a database; (vi) quantitation of inflammatory cells and inflammation modulator features; (vii) derivation of an immune system state score; (viii) developing selection criteria based on the immune system state score to create groups of patients; (ix) stratification of patients based on said score selection criteria; and (x) selection of patients for a specified therapy, treatment efficacy level, or treatment toxicity level, based on stratification groups. FIG. 1 outlines an example of the process to arrive at an immune system state score, and the use of the score to stratify patients for patient selection applications.

Tissue Acquisition, Preparation and Embedding:

The tissue preparation process comprises: collection/acquisition of a tissue specimen or sample; fixation of the tissue sample; transporting the sample to a histology laboratory; and creating a tissue block in which the tissue is embedded in a specified media. A specimen or sample can be acquired by way of biopsy, excision, and the like. Tissue sample fixation may include using a fixative, such as formalin or other fixative. A histology laboratory may include any laboratory or facility suited to receive and process the tissue sample. The tissue block media may include paraffin or similar media.

For purposes, herein, a "tissue specimen", "patient sample" or "sample under investigation" may be referred to as a "tissue sample."

A similar process is followed in the collection and preparation of frozen tissue samples, with the exception that freezing media is utilized instead of fixation media, resulting in a frozen tissue sample which is processed to a tissue slide using standard and accepted histological procedures.

This tissue preparation process can have a considerable effect on how the cell features of interest will be expressed in the tissue sections. Careful control needs to be applied to standardize this process.

Slide Preparation and Staining:

The slide preparation process comprises standard and accepted histological procedures, including: the cutting of the tissue block into tissue sections that are placed on glass slides, also known as histology slides, and the subsequent staining of the slides to make the specific cell features of interest detectable for cell-based image analysis. Suitable stains may include, for example, Hematoxylin and Eosin (H&E), Immunohistochemistry (IHC) stains, and the like. A single tissue section, multiple tissue sections, and multiple serial sections can be cut from a single block containing a tissue sample.

In an embodiment herein, the tissue sample is stained for one or more markers of inflammatory cell types (e.g. CD3, CD8, CD45RO, FoxP3, and the like), and an additional stain is used to identify cells (e.g. Eosin). Additionally, staining for one or more of the markers of a modulator of inflammation (e.g. cytokines, interleukin family of molecules, chemokines, and the like) can be utilized to further map the immune system state in a tissue sample. Markers for "inflammatory cell types" or "modulators of inflammation" will be referred to collectively as "markers of the immune system state."

One or more stains for markers of the immune system state can be applied to a first tissue section. A second serial section may be cut and stained with H&E for analyzing the IHC stained section in the context of tissue features highlighted by H&E staining. Multiple serial sections may be cut from a tissue sample, and each section may be stained with a different marker of the immune system state (e.g. CD8 and FoxP3) for use in analyzing the interactions between multiple inflammation regulators within a tissue sample. H&E staining of one of the serial sections will be utilized when two or more serial tissue sections are generated from a tissue sample. The resulting H&E stained section will be used as a template to overlay and co-register multiple IHC images prior to analysis by a software system. Furthermore, one or more stains for markers of the immune system state can be applied across multiple tissue sections from a tissue sample (non-serial) when co-registration of each marker is not necessary, for example, when assessing heterogeneity of the immune system state across a large tumor mass.

In a further embodiment of this invention, IHC staining for one or more cell proliferation biomarkers (e.g. Ki-67, phosphorylated histone H3, and the like) can be used concurrently with one or more markers of the immune system state in serial tissue sections from a tissue sample. Likewise, concurrent staining for one or more biomarker of cell death (e.g. cleaved caspase 3, caspase 8, caspase 9, cytochrome c, annexin V, AIF, and the like) can be used alongside one or more marker of the immune system state. Concurrently staining the tissue sample with markers of the immune system state and cell proliferation and/or cell death biomarkers is utilized to highlight associations between inflammatory modulators and biologic endpoints, like cellular proliferation or death, which result from inflammatory mechanisms. H&E staining will be used for one tissue section in these instances to provide a template by which to co-register multiple stained tissue sections prior to analysis by a software system.

The cutting of the tissue block (e.g. depth) and the staining process itself can have a considerable effect on how the cell features of interest are expressed in the tissue sections. Careful control should be applied to standardize this process.

Slide Digitization

Histology slides can be digitized using commercially available digital microscopes and/or slide scanners, for example, those offered by Aperio, Cri, Hamamatsu, Leica, Omnyx, Philips, Ventana and 3DHistech. Different imaging acquisition techniques (e.g. bright-field, fluorescence, multi-spectral, polarized) can be used to create a digital image of a histology slide. In some cases, different image acquisition techniques can be applied to the same histology slide, resulting in multiple images for a single slide. The digitization of a slide can have a considerable effect on how the cell features of interest are imaged. Thus, careful control should be applied to standardize this process.

Digital Image Analysis of Tissue

Digital image analysis is carried out over a partial area or the whole area of a tissue section once non-analyzable regions (e.g. tissue artifacts, image blur, wrong tissue type, etc.) have been removed by annotations. An image analysis software system is used to identify individual cells by analyzing a general stain used to highlight cells or cell sub-compartments (e.g. Hematoxylin). Once the cells within the image have been accurately identified, the software system extracts a multitude of pixel-based and cell-based features for each cell, in turn. The extracted features the software system characterizes are cell morphologic (e.g. size, shape, etc.), staining (e.g. Eosin staining intensity, etc.), cell neighborhood (e.g. average size of nuclei in a region around each cell, etc.), and cell distribution (e.g. clustered or diffuse distribution pattern) in nature. For each cell, the software system attributes and stores the extracted features for future recall. These cell attributed features will ultimately be used to stratify cells to select specific tissue compartments (e.g. tumor and stromal cells) for further analysis. The fidelity of cell detection and extraction of cell-based features can have considerable impact upon how the cell features of interest are interpreted and, therefore, great care needs to be exercised to accurately detect the cells and cell sub-compartments (e.g. nucleus, cytoplasm, cell membrane) in an image.

Tissue Compartment Selection:

Measuring inflammatory cells and modulators of inflammation in the context of tumor tissue and other relevant tissue compartments (e.g. stromal compartment) is of great interest in oncology. Therefore, a tissue compartment stratification and selection scheme is employed to select only those cells in a tissue compartment of interest (e.g. tumor tissue or stromal tissue). The tissue compartment selection scheme segregates cells into each tissue compartment based on selection criteria for specific cell morphometric, staining features, or cell neighborhood characteristics that optimally stratify each tissue compartment. This process can be manual, semi-automated, or automated to identify those cell-based features extracted from the image that best stratify tissue compartments.

Figure 2:
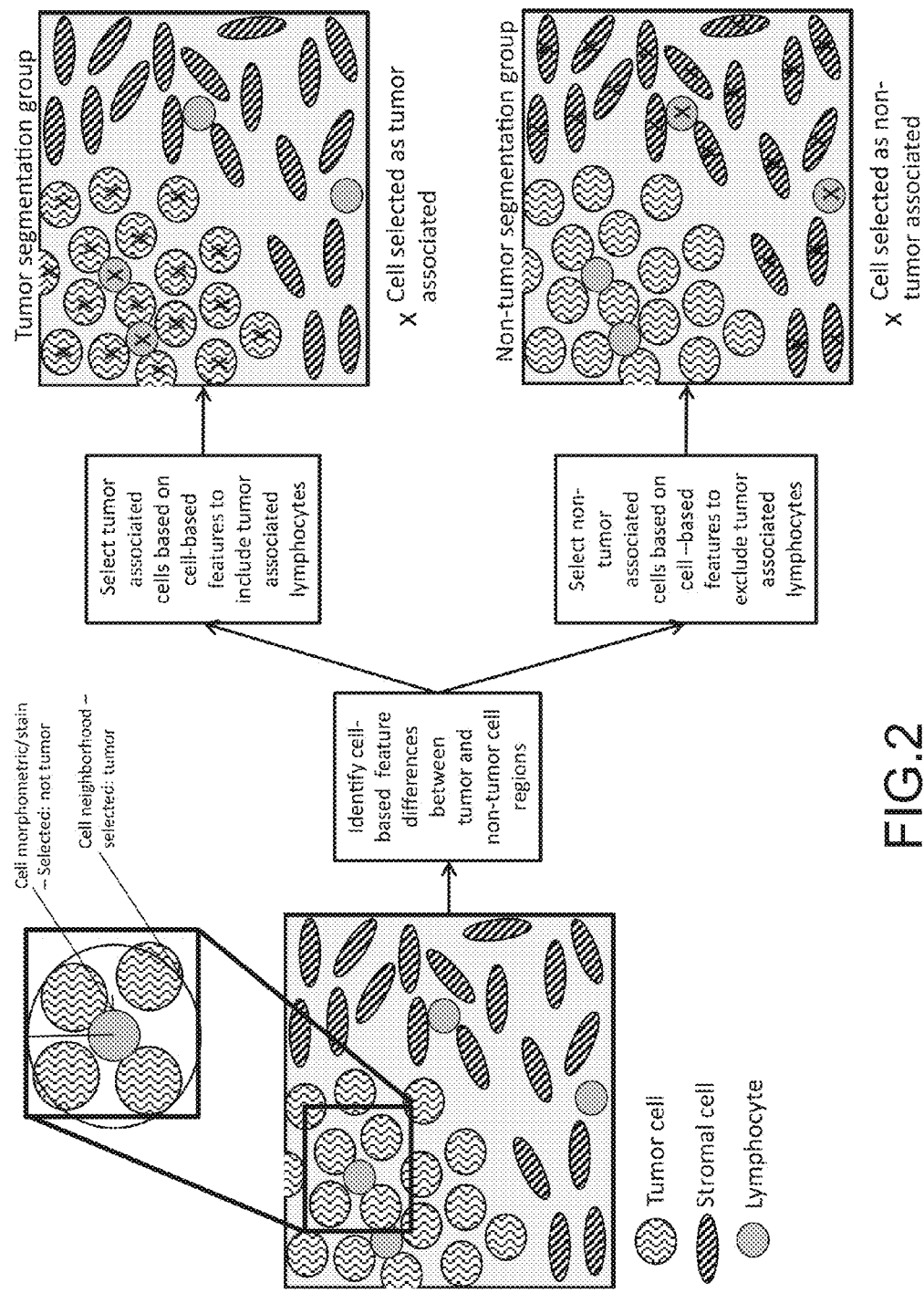
FIG. 2 depicts a tissue compartment selection scheme based on cell morphometric, stain features, and/or by attributing cell neighborhood morphometric, staining, and/or distribution features to each cell in tumor tissue or the surrounding non-tumor tissue.

In the context of this invention, it is crucially important that the tissue compartment selection scheme employed accurately segregate tumor-infiltrating inflammatory cells or modulators of inflammation with the tumor tissue compartment, and inflammatory cells or modulators of inflammation that are localized in other relevant tissue compartments with said tissue compartments. In an embodiment of this invention, as illustrated in FIG. 2, a tissue compartment stratification scheme based on cell morphometrics, cell staining, and cell neighborhood characteristics is employed which includes tumor-infiltrating inflammatory cells or modulators of inflammation (e.g. CD8+ lymphocytes) within the selected tumor compartment, and stromal-infiltrating inflammatory cells or modulators of inflammation (e.g. CD8+ lymphocytes) within the stromal tissue compartment.

Figure 3:
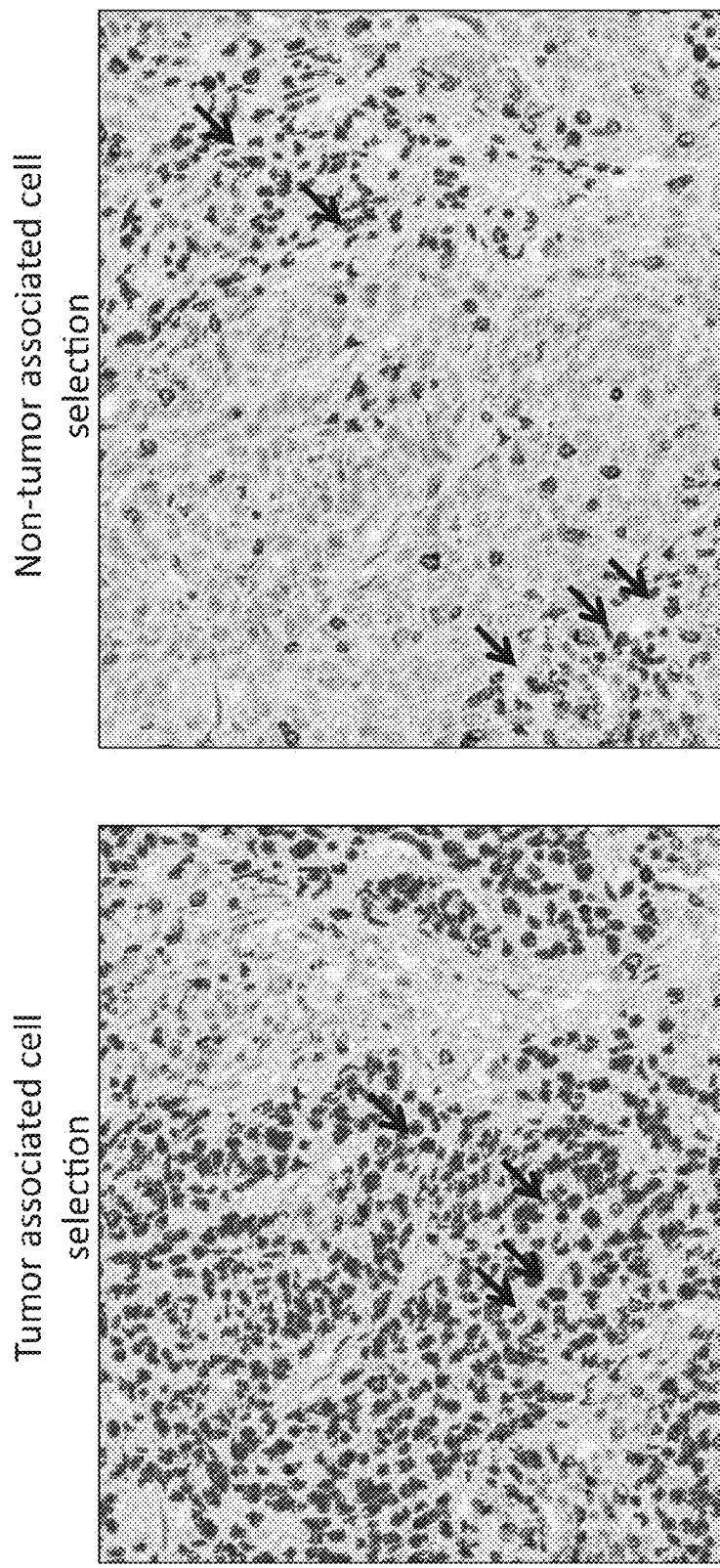
FIGS. 3(A-B) provide example images displaying the results of the tissue compartment selection scheme based on cell morphometric, staining, or neighborhood characteristics.

FIGS. 3(A-B) demonstrate the effectiveness of the above tissue compartment selection scheme which includes inflammatory cells within their correct tissue compartment (dark red annotated cells representing inflammatory cells included with blue annotated cells representing the cells of the tissue compartment of interest). FIG. 3A shows the tumor tissue compartment selection scheme result, and FIG. 3B shows the non-tumor selection scheme result. Blue annotations signify selected cells negative for a marker of an inflammatory cell type and dark red annotations signify selected cells positive for a marker of an inflammatory cell type.

Figure 4:
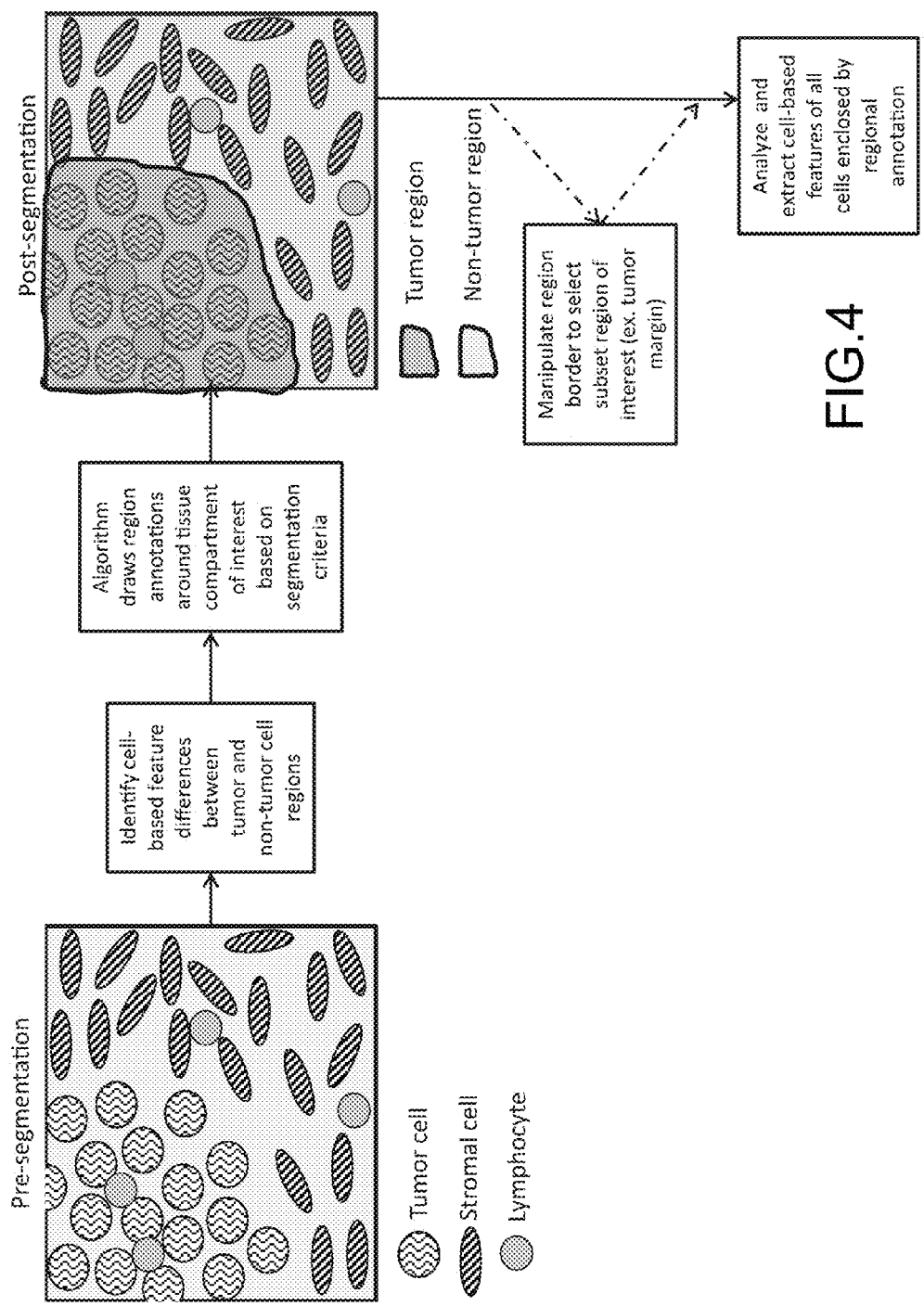
FIG. 4 illustrates a tissue compartment selection scheme whereby a regional annotation is formed around a tissue subtype of interest.

In another embodiment, as illustrated in FIG. 4, a tissue compartment selection scheme that defines regional annotations around tumor or other relevant tissue is employed. Cell-based or cell neighborhood-based morphologic and/or staining features are utilized to differentiate between tumor tissue and other relevant tissue types. Selection criteria are selected for the cell-based and cell neighborhood-based features that differentiate between the tissue compartments of interest. The software system then builds an annotation region around the correctly selected tumor or other relevant tissue compartments, thus creating tissue compartment regions across the tissue section that encompass infiltrating inflammatory cells or inflammatory modulators (solid grey circles located within their respective tissue sub-type in FIG. 4). Alternatively, the tissue compartment(s) of interest can be identified by manual annotation of the tissue section to select the tissue type of interest for further analysis.

The established annotation regions created by the above mentioned tissue compartment selection scheme can be used to assess the entirety of the tissue compartment of interest as illustrated, or the annotation regions can be manipulated to encompass only a feature of interest within or adjacent to each tissue compartment of interest (e.g. tumor margin). Once the final configuration of regional annotations is in place around a tissue compartment, the software system is used to analyze each cell included within the annotation region.

Figure 5B:
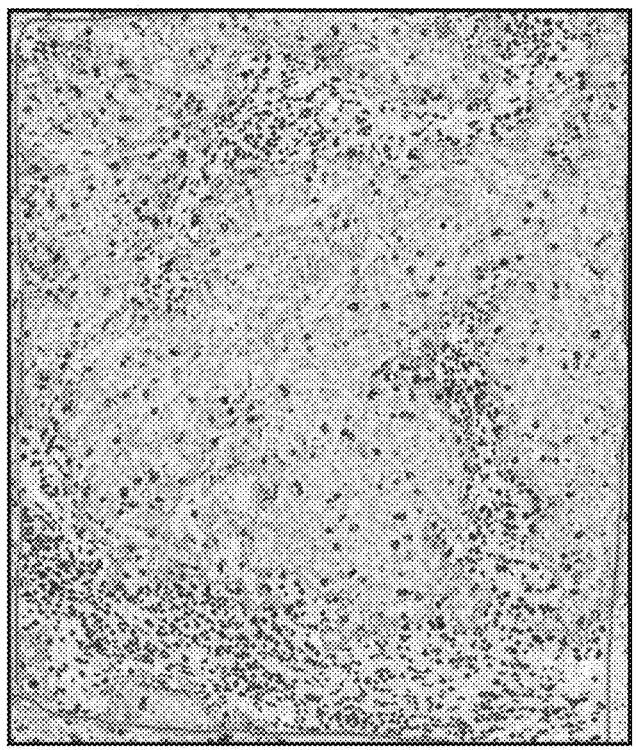
FIGS. 5(A-B) provide example images displaying the results of the regional annotation based tissue compartment selection scheme.
Figure 5A:
Figure 6A:
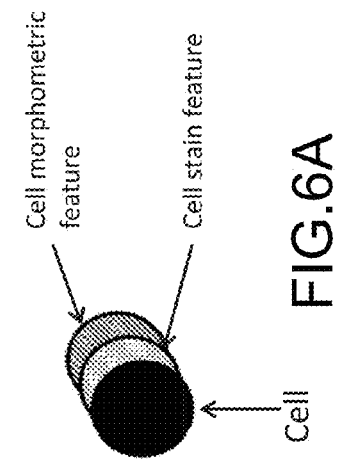
FIGS. 6(A-D) illustrate the various levels of morphometric, staining, and cell distribution features extracted and analyzed by embodiments of this invention.
Figure 6B:
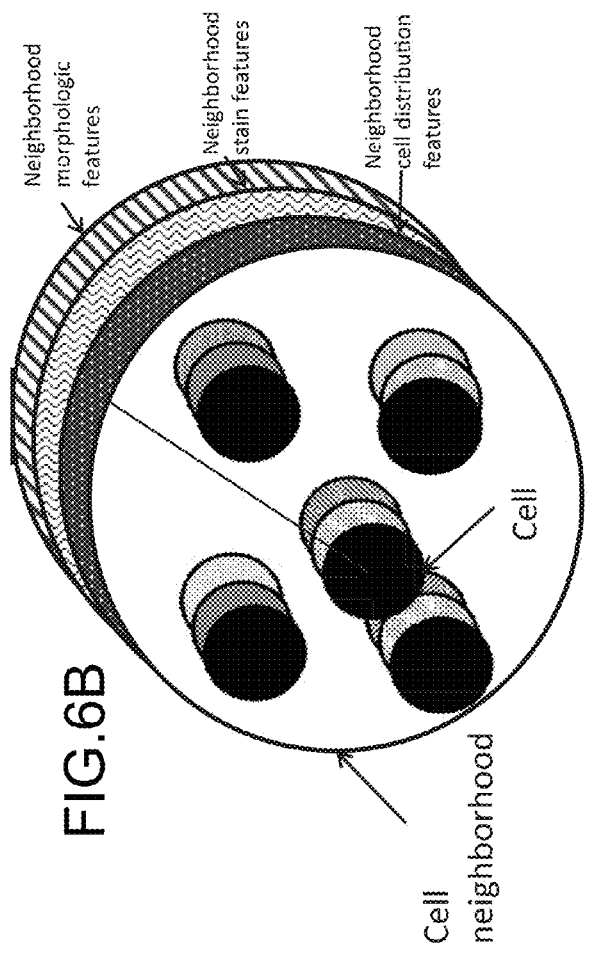
Figure 6C:
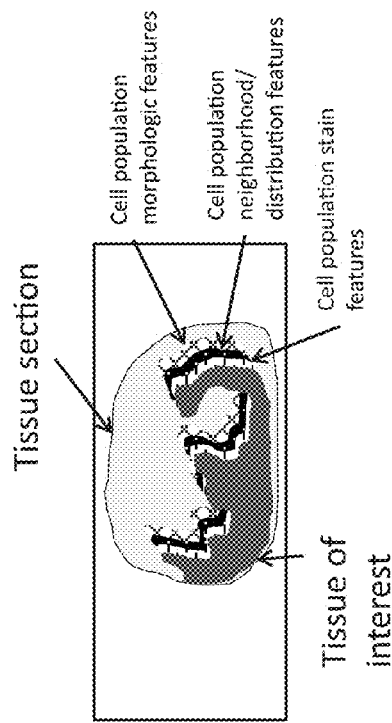
Figure 6D:
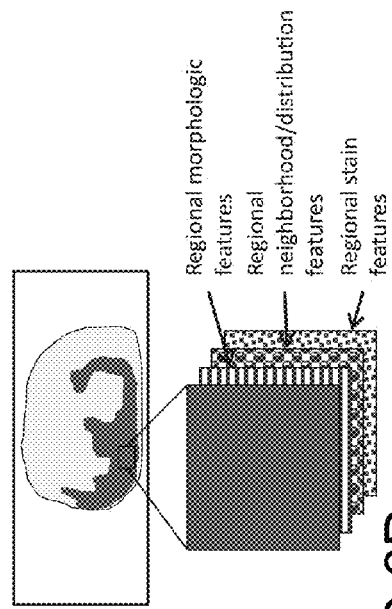

In FIGS. 5(A-B), all cells located within the regions are detected and tissue compartment cells are denoted by blue annotations while the cells expressing a marker of the immune system state (e.g. CD8+ T-cells) are denoted by dark red annotations in each tissue compartment of interest. FIG. 5A is the tumor compartment selection scheme result and FIG. 5B is the non-tumor selection scheme result. Blue annotations signify selected cells negative for a marker of an inflammatory cell type and dark red annotations signify selected cells positive for a marker of an inflammatory cell type.

FIGS. 6(A-D) show an example of the results from this region definition process, and the subsequent analysis of and extraction of cell-based features from cells included within the tissue compartment of interest. FIG. 6A shows the cell, cell stain feature, and cell morphometric feature. FIG. 6B shows the cell neighborhood including cells within the neighborhood region, neighborhood cell distribution features, neighborhood stain features, and neighborhood morphologic features. FIG. 6C shows a tissue of interest within a tissue section, the features including cell population stain features, cell population neighborhood and distribution features, and cell population morphologic features. FIG. 6D shows a region of interest, the features including regional stain features, regional neighborhood and distribution features, and regional morphologic features.

Analysis of Marker for Inflammatory Cell Type or Inflammatory Modulator

Once the tumor and other relevant tissue compartments have been stratified and selected, evaluation of the expression level of the marker(s) of the immune system state is analyzed to identify those cells staining above or within a threshold value. Cells staining above a specified threshold for an inflammatory cell type marker are defined as 'positive' and are interpreted as the cell type labeled by the specific marker (e.g. positive for CD8 staining, interpreted to be a cytotoxic T-cell). Cells can also be stained with a marker for an inflammation modulator (e.g. PD1), a biomarker of cell cycle status (e.g. Ki-67), and a biomarker of a cell undergoing apoptosis (e.g. cleaved caspase 3). A defined threshold for expression level of these markers, or range of threshold values, will be used to interpret the type, status, or impact these cells may have on the inflammatory response. Alternatively, for instances where a positive-negative response does not capture the biologic context of the marker expression, a histologic scoring grade (e.g. 0, 1+, 2+, 3+) can be applied to the staining levels of the above mentioned types of molecules.

The definition of the threshold for 'positive' expression of a marker of the immune system state or the histologic scoring grade levels can have significant impact upon the correct identification of types of inflammatory cells or modulators of inflammation and interpretation of results. It is recommended, without requirement for or to limit the scope of this invention, that the threshold for a positive expressing cell and histologic grade to be guided by a pathologist reviewing one or more of: the original tissue section under an optical microscope, the digital image of the tissue section, and the digital image analysis quantitation of the marker of the immune system state in the tissue section.

Digital image analysis of inflammatory cells or cells expressing modulators of inflammation is performed once the threshold for 'positive' cells or histologic grade has been defined. A key feature of digital image analysis of tissue sections embodied in this invention is that the structural and contextual tissue morphology of the cells in each tissue compartment of interest can be captured and assessed. These features can be assessed in a manner that goes far beyond the capabilities of manual assessment using an optical microscope. The cell-based features being extracted and analyzed from the digital image typically include, but are not limited to, features that represent a cell's physical presentation on the slide (e.g. size), the quantity of inflammatory cells (e.g. CD8+ cells) in a tissue compartment, features that represent the surface texture surrounding a cell (e.g. surface profile density), expression level of a marker of immune system status(s) (e.g. cytokine expression), the localization of each cell relative to tissue features (e.g. CD8+ cells near the tumor/stroma interface), the distribution of cell types relative to each other (e.g. average distance between CD8+ and FoxP3+ cells), and the distribution of cells of a particular cell type relative to one another (e.g. clustered or diffuse organization of CD8+ cells).

As referenced above, FIGS. 6(A-D) illustrate various levels of cell, cell neighborhood, and tissue features that can be quantified for markers of the immune system state within the context of a whole tissue section. Each cell (black circles) detected in an image can be described by a combination of morphologic and staining characteristics (greyscale patterns, FIG. 6A). Each cell can also be described by summarizing the features (e.g. average size, profile surface density, etc.) of the cells in the cell neighborhood (white circle around cells, FIG. 6B). The cell neighborhood features can describe morphometric, stain, or distribution/localization information about the surrounding cells (greyscale patterns, FIG. 6B). This concept extends to the tissue level, whereby a tissue, tissue compartment, or tissue region (shown in dark grey, FIGS. 6C & 6D) can be characterized by a summarization of the cell, cell neighborhood, cell population, and cell distribution/localization features included within (greyscale patterns, FIGS. 6C & 6D).

A visual summary of the cell, cell neighborhood, cell population, regional, and tissue features described in FIGS. 6(A-D) can be displayed in a graphical manner to provide an overview, or a qualitative assessment, of a tissue section and the immune system-tumor interactions occurring within. This visual summary can include, but is not limited to, displaying average quantified values for each tissue section, or subregion within the section, overlaid on an image of the tissue section. The values can be displayed in numeric form or as a heatmap corresponding to each value. Further, a visual summary of the numeric values or a heatmap can be created that displays the correlation, interaction, or ratio of two or more markers of the immune system state or biomarkers of cell proliferation and/or cell death. Finally, the variability (i.e. heterogeneity) of any measure relating to cell, cell neighborhood, and cell population features can be quantified and summarized across tissue regions, or the whole tissue section, and displayed as a heterogeneity map of a tissue section.

Derivation of Immune System State Score

It would be difficult to draw an overall conclusion about the immune system state for a tissue section given the plurality of parameters and features measured in a single analysis from a single assay condition (e.g. one stain for a marker of the immune system state in one tissue section) of a tissue sample from the methods described herein. Thus, this invention entails deriving a score which summarizes the key parameters and features needed for drawing inferences about a patient's potential response(s) to a given therapy or, as a surrogate endpoint for, treatment efficacy/toxicity level.

Figure 7:
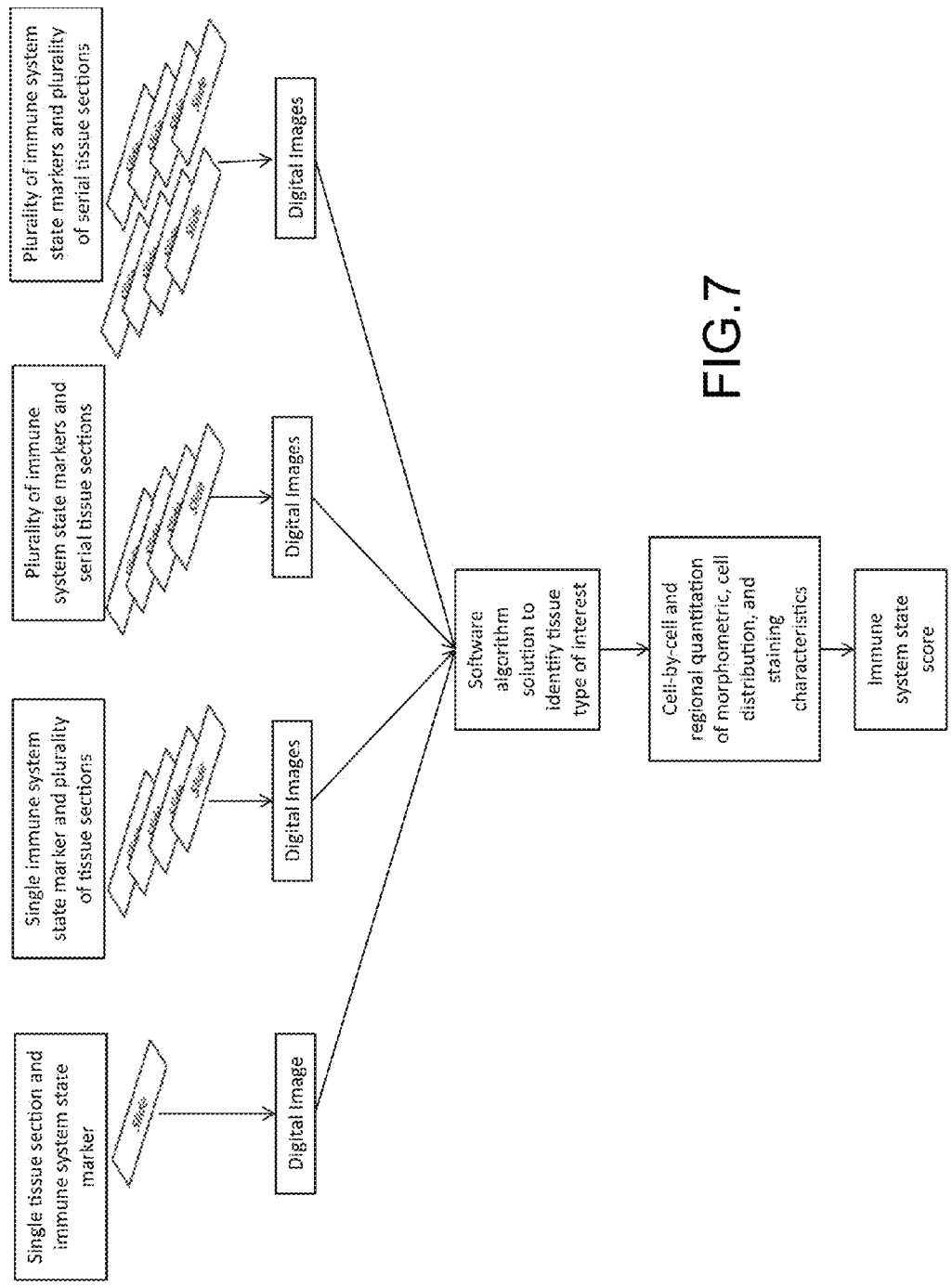
FIG. 7 demonstrates a schematic of the various embodiments by which an immune system state score can be derived.

The flowchart illustrated in FIG. 7 outlines the methods by which an immune system state score can be derived for a tissue sample. A single section, a plurality of sections, multiple serial sections, or multiple sets of multiple serial sections can be generated from a single tissue sample and stained with a single, or plurality of, markers of the immune system state. Further, a single analysis metric, or a plurality of analysis metrics, for each slide in the afore mentioned configurations can be measured. Thus, the score may be derived from a single analysis metric, or a plurality of analysis metrics, from a single assay condition, or may be derived by combining a single or plurality of analysis metrics from a plurality of assay conditions. Therefore, the score represents a single summary metric for the immune system-tumor, or immune system-relevant tissue, interaction within a tissue sample that can be used to guide clinical (e.g. patient selection) decisions.

Patient Stratification Based on the Immune System State Score

In one embodiment of this invention, the parameters used to derive the immune system state score can be prospectively chosen from those image analysis parameters and assay conditions predicted, or known, to be relevant to the disease state of the patient cohort (e.g. CD8+ cell density in tumor tissue).

The selected parameters can be combined to provide the most statistically predictive metric. Once score parameters are defined, a score is computed for each patient in a study cohort and the distribution of scores is assessed to determine the number of unique sub-populations present.

Figure 8:
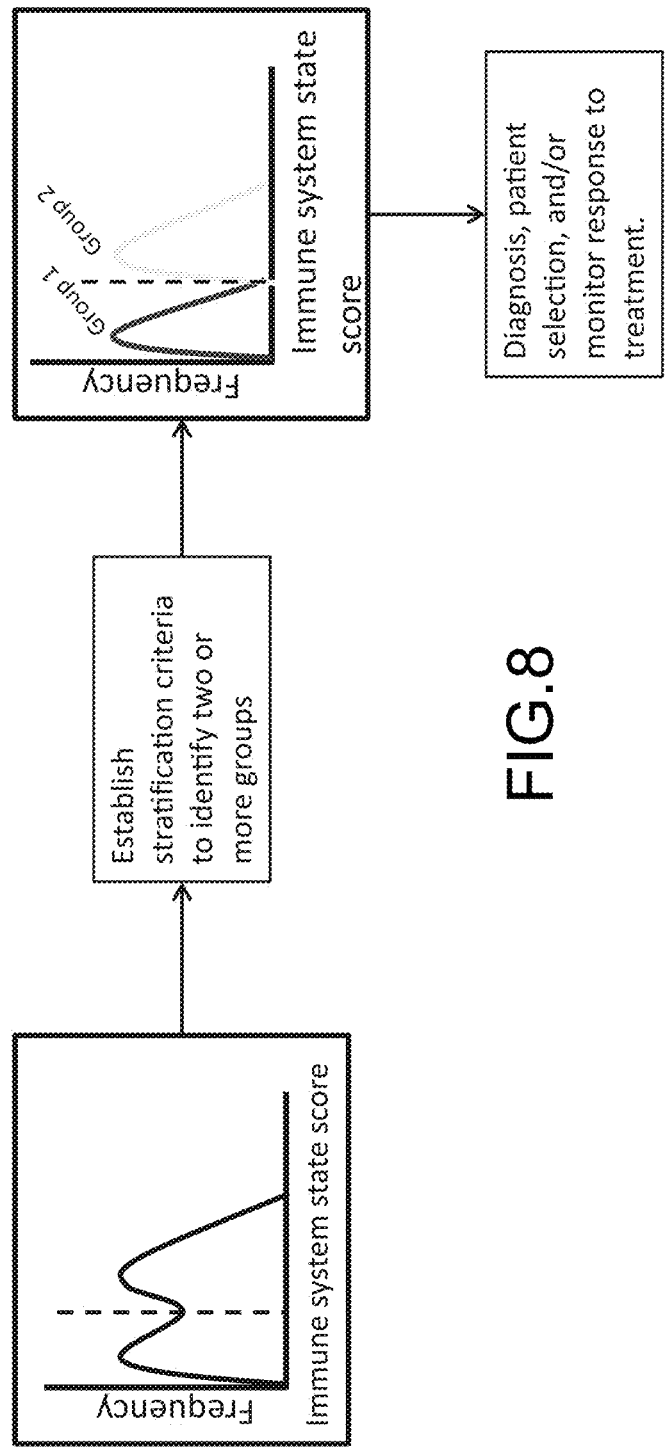
FIG. 8 depicts a scheme for stratifying patients based on the immune system state score.

FIG. 8 illustrates a theoretical distribution of scores for a patient cohort and the assignment of selection criteria (in this example, a cutoff) for stratifying the patients into two groups. In practice, this process can be used to define two or more groups, whereby the number of stratification groups is determined based on the context of the specific application (e.g. stratifying patients onto a scoring scheme analogous to the 0, 1+, 2+, 3+ histologic scoring scheme), or based on statistical evaluation of the distribution of scores. Once stratified into two or more groups based on the immune system state score, patients will be selected for, or excluded from, a specified therapeutic approach or treatment efficacy/toxicity level based on the stratification group to which they belong.

In another embodiment of this invention, a training set of patients previously stratified based on clinical or biomarker data will be used to derive or refine the selection of image analysis parameters and assay conditions included in the derivation of the immune system state score.

Figure 9:
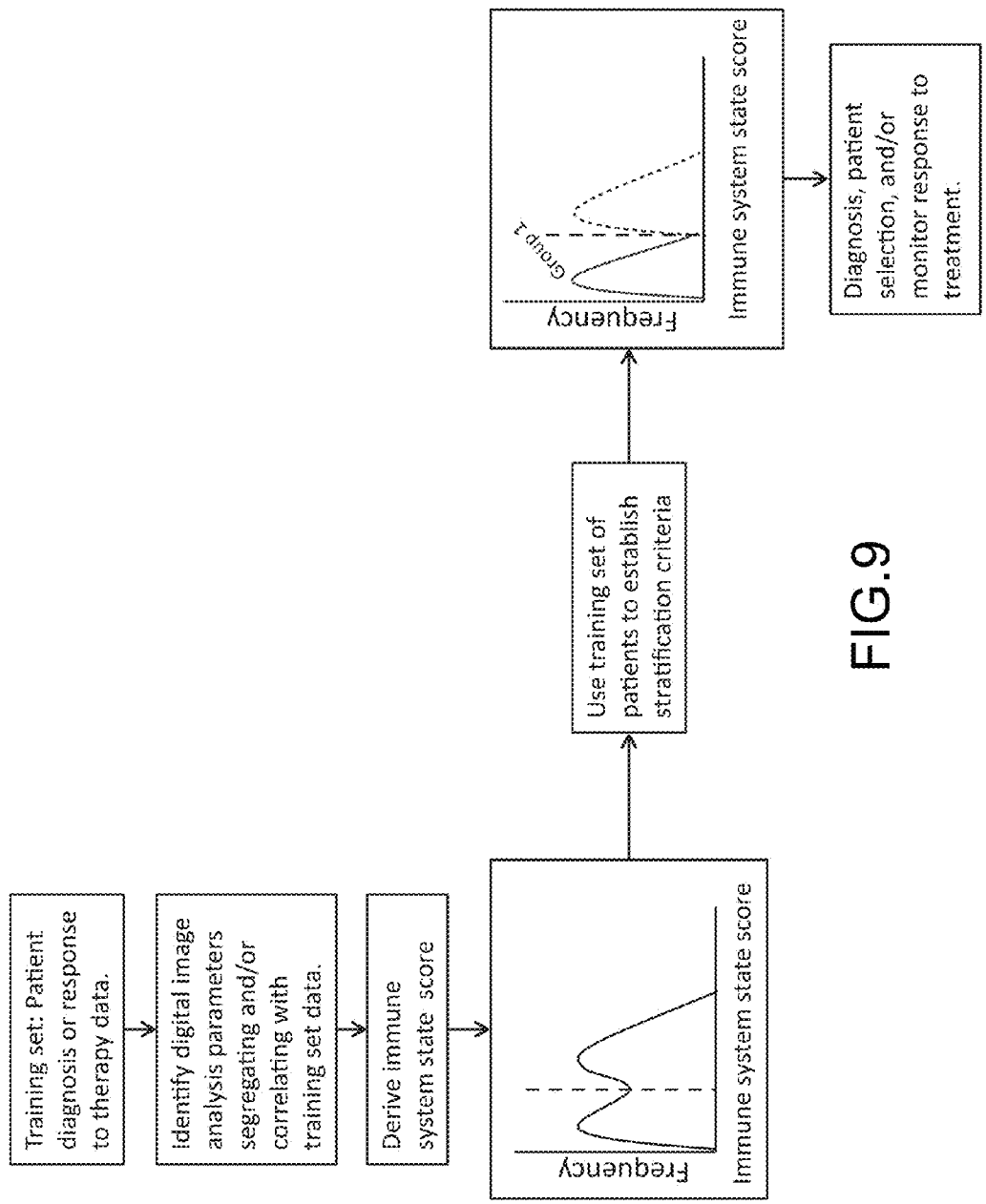
FIG. 9 depicts using a training set of pre-stratified patients to derive and optimize an immune system state score prior to its implementation for stratifying patients.

FIG. 9 outlines the score derivation scheme based on a training set of pre-stratified patients. Statistical methods will be utilized to determine which of the many image analysis parameters from each assay condition are predictive of stratification group. Those parameters that are predictive of patient stratification group for the training set of patients will be combined in the most predictive manner to calculate an immune system state score. The resulting scoring scheme will then be applied for the stratification of subsequent patient cohorts. Based on the scoring and stratification scheme, patients will be selected for or excluded from a specified therapeutic approach or treatment efficacy/toxicity level based on the stratification group to which they belong.

The patient stratification method according to the invention is potentially useful for stratifying patients with cancer selected from the group consisting of brain and central nervous system cancer (e.g. neuroblastoma, meningioma, astrocytoma, oligodendrogliomas, ependymoma, gliomas, medulloblastoma, ganglioglioma, Schwannoma, germinoma, craniopharyngioma), female reproductive tissue cancers (e.g. breast cancer, cervical cancer, ovarian cancer, vaginal cancer, vulvar cancer, uterine cancer), male reproductive tissue cancers (e.g. testicular cancer, prostate cancer, penile cancer, breast cancer), adrenal cortical cancer, anal cancer, bile duct cancer, bladder cancer, bone cancer, blood cancers, Castleman disease, colorectal cancer, endometrial cancer, esophagus cancer, gallbladder cancer, gastrointestinal carcinoid tumors, Hodgkin's disease, non-Hodgkin's lymphoma, Kaposi's sarcoma, kidney cancer, laryngeal and hypopharyngeal cancer, liver cancer, lung cancer, mesothelioma, plasmacytoma, nasal cavity and paranasal sinus cancer, nasopharyngeal cancer, oral cavity and oropharyngeal cancer, pancreatic cancer, pituitary cancer, retinoblastoma cancer, rhabdomyosarcoma, salivary gland cancer, skin cancer, stomach cancer, thymus cancer, and thyroid cancer.

Figure 10B:
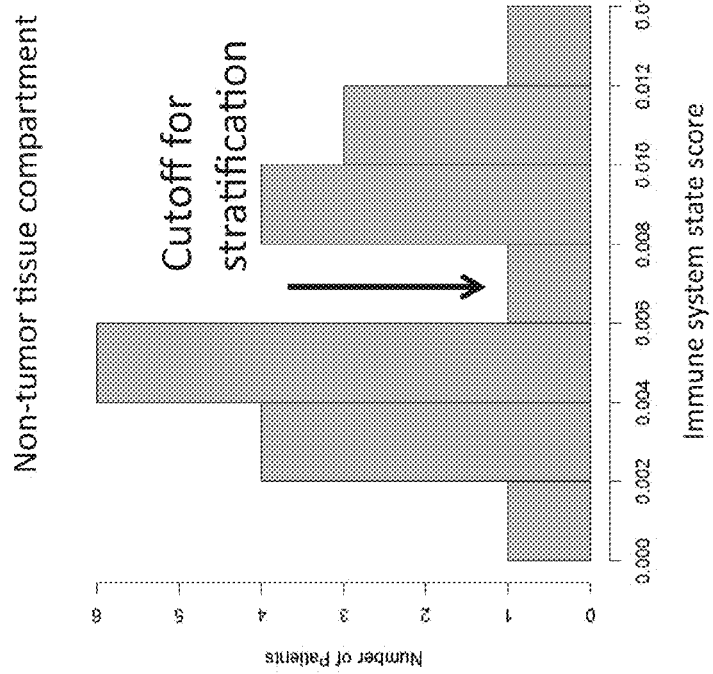
FIGS. 10(A-B) show an example immune system state score for patient stratification based on the quantity of an inflammatory cell type in a tissue compartment.
Figure 10A:
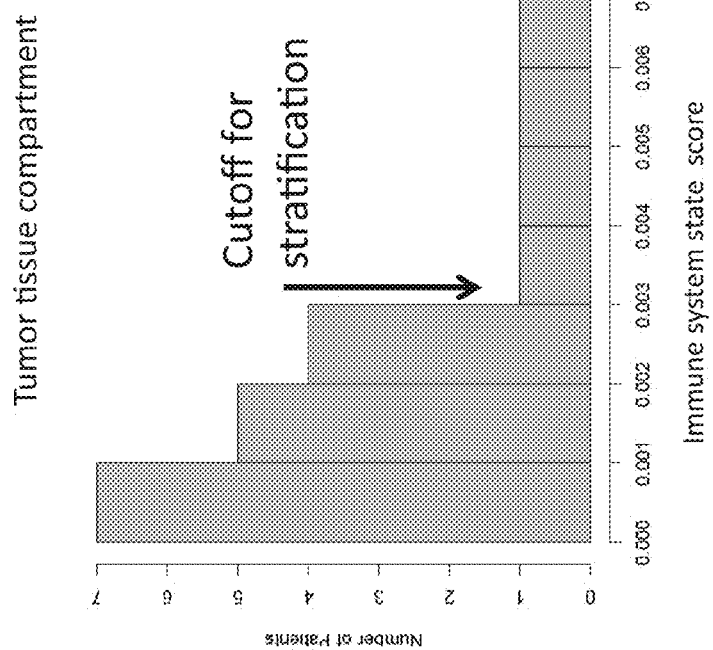

FIGS. 10(A-B) provide an example of the immune system state scoring scheme for stratifying patients into two or more groups based on inflammatory cell density in tumor and stromal tissue compartments for a patient cohort of twenty tissue samples. FIG. 10A shows the scoring scheme in accordance with the tumor tissue compartment. FIG. 10B shows the scoring scheme in accordance with the non-tumor tissue compartment.

Figure 11B:
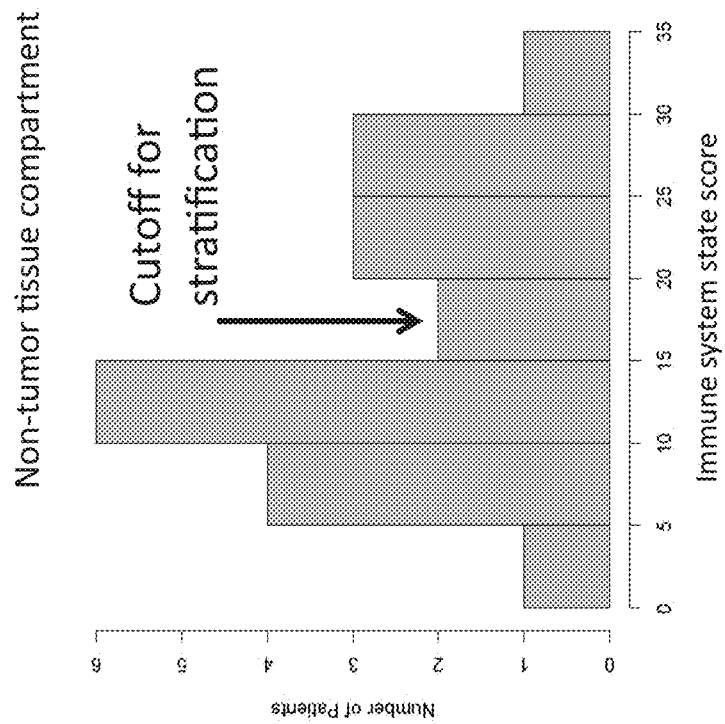
FIGS. 11(A-B) show an example immune system state score for patient stratification based on a regional summary of inflammatory cell distribution features.
Figure 11A:
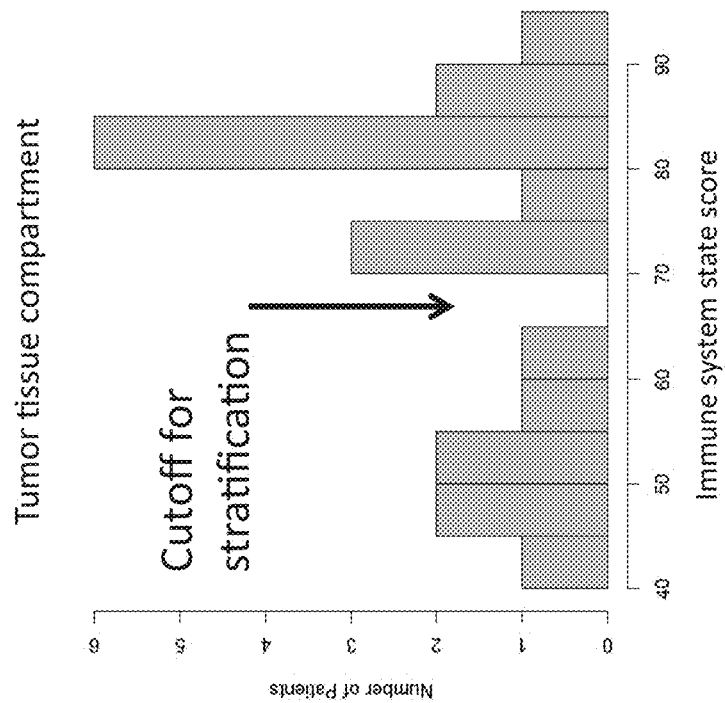

FIGS. 11(A-B) show an example of stratifying patients based on the immune system state score derived from regional summaries of inflammatory cell distribution in tumor and stromal tissue compartments for a patient cohort of twenty tissue samples. FIG. 11A shows the patient stratification in accordance with the tumor tissue compartment. FIG. 11B shows the patient stratification in accordance with the non-tumor tissue compartment.

Figure 12B:
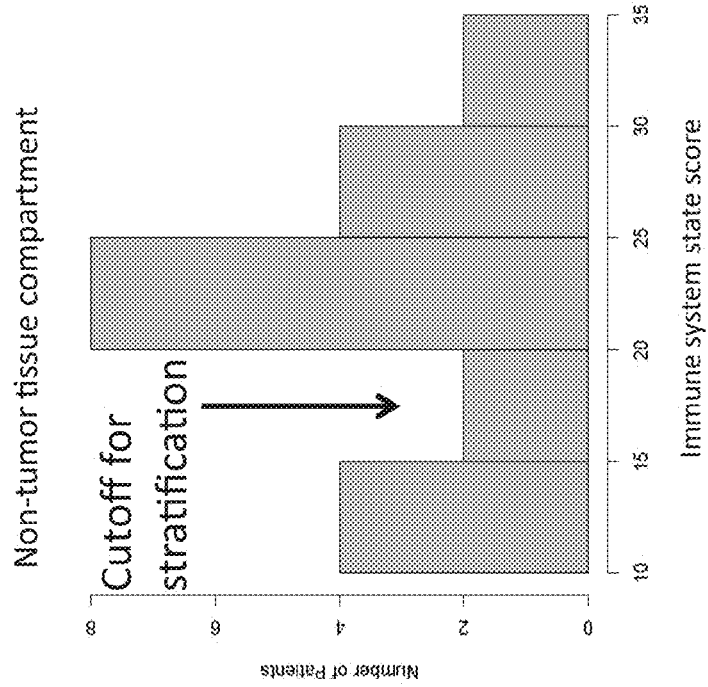
FIG. 12(A-B) show an example immune system state score for patient stratification based on regional variability of inflammatory cell distribution features.
Figure 12A:
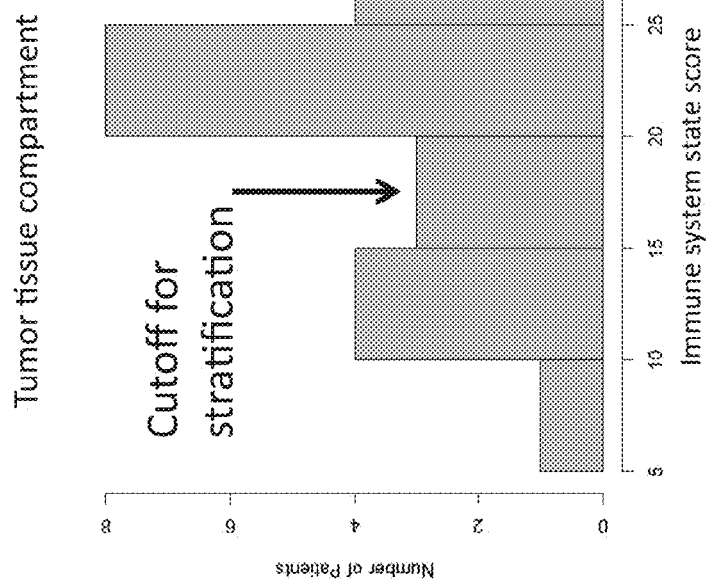
Figure 13A:
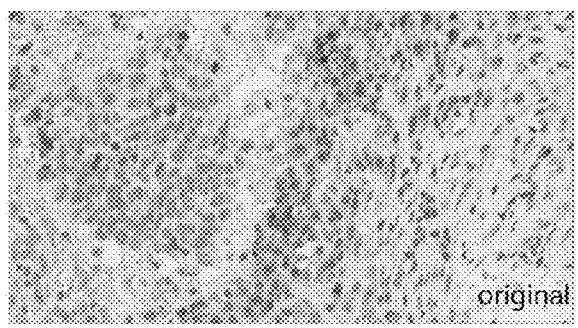
FIGS. 13(A-H) show an example immune system state score for patient stratification based on inflammatory modulator expression relative to tissue features.
FIG. 13I shows a legend indicating colorimetric intensity of biomarker expression and color scheme.
FIG. 13J shows a plot of percent marker positive cells with respect to distance from the identified tumor in accordance with FIGS. 13(A-I).
Figure 13B:
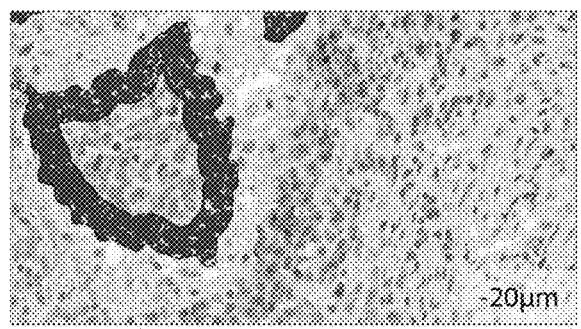
Figure 13C:
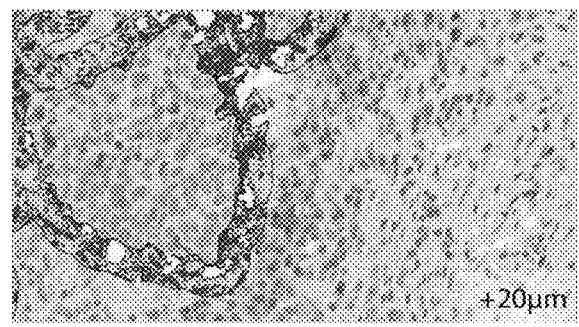
Figure 13D:
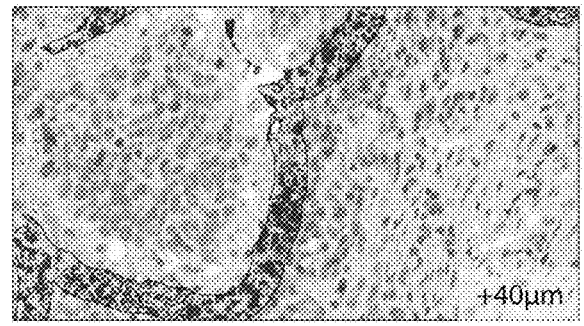
Figure 13E:
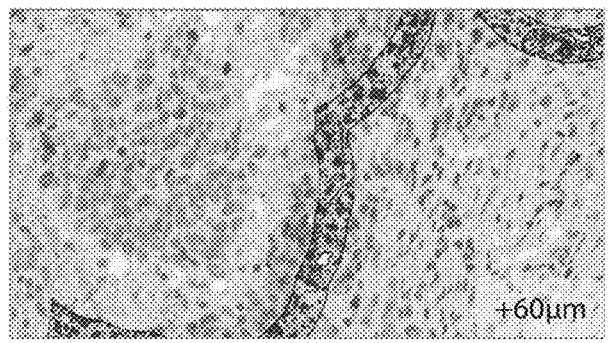
Figure 13F:
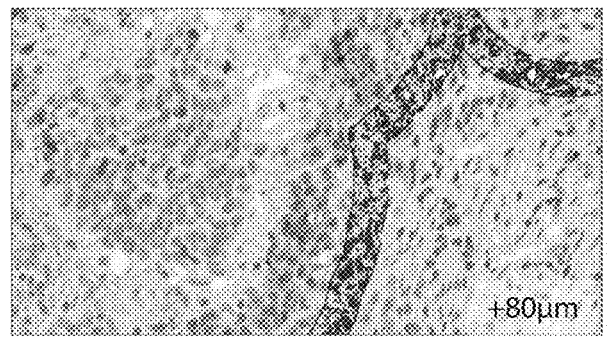
Figure 13G:
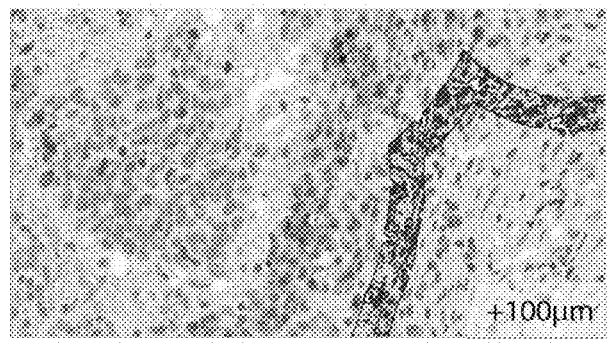
Figure 13H:
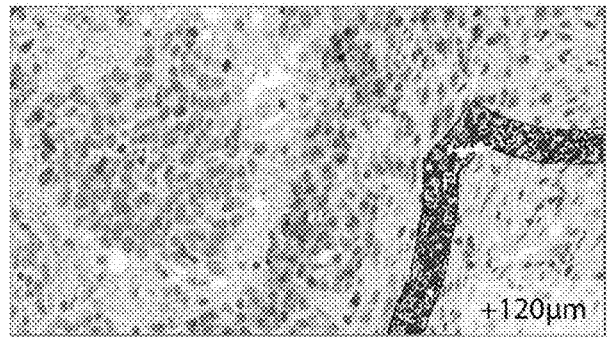
Figure 13I:
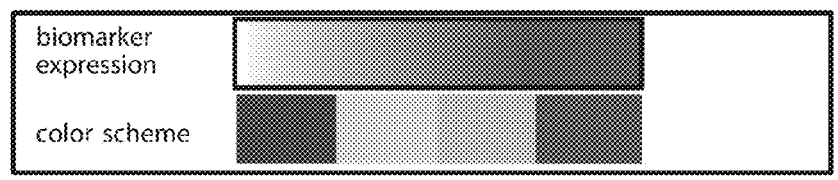
Figure 13J:
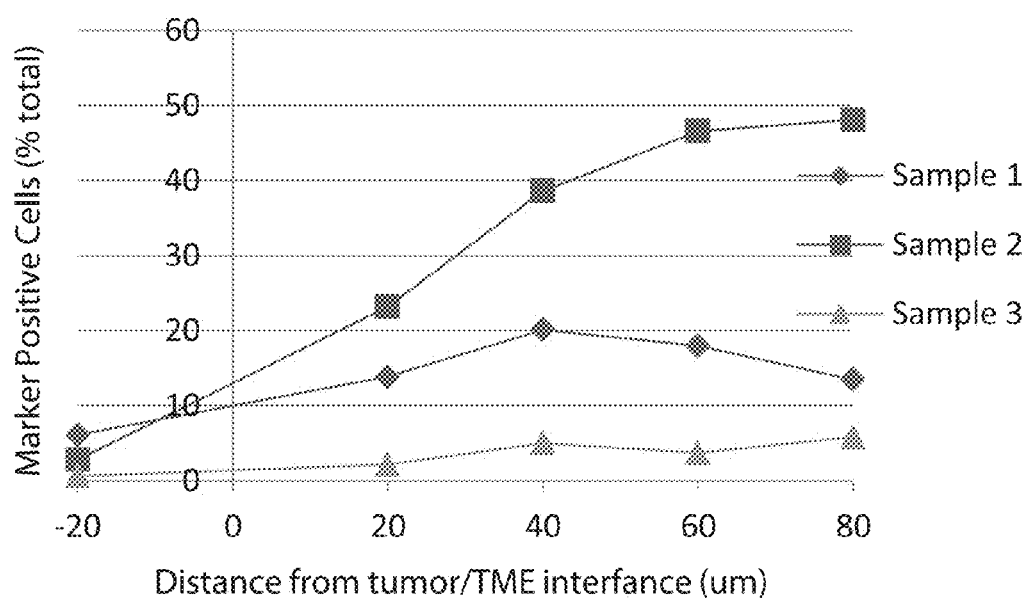

FIGS. 12(A-B) show an immune system state score derived from inflammatory cell distribution heterogeneity across whole slide images for a patient cohort of twenty tissue samples which was used to stratify patients into two groups. FIG. 12A shows the scoring scheme in accordance with the tumor tissue compartment. FIG. 12B shows the scoring scheme in accordance with the non-tumor tissue compartment.

FIGS. 13(A-J) demonstrate stratifying patients based on measuring cell features relative to tissue architecture. Expression levels of an inflammation modulator are quantified in concentric regions extending away from the tumor-stroma interface. FIG. 13A shows the original image, FIGS. 13(B-H) demonstrate biomarker staining levels in each concentric region extending away from the tumor-TME interface. FIG. 13I shows a colorimetric legend relating to FIGS. 13A-H. FIG. 13J shows a plot of three different marker localization phenotypes for three example patient samples. An immune system state score is associated with each curve in FIG. 13J and used to stratify patients.

REFERENCES

1. Melichar et al., "Predictive and Prognostic Significance of Tumor-infiltrating Lymphocytes in Patients with Breast Cancer Treated with Neoadjuvant Systemic Therapy", *Anticancer Res.* 2014, 34(3):1115-1125.
2. Shi et al., "Margin-Infiltrating CD20+ B Cells Display an Atypical Memory Phenotype and Correlate with Favorable Prognosis in Hepatocellular Carcinoma", *Clin Cancer Res.* 2013, 19(21):5994-6005.
3. Mlecnik et al., "Histopathologic-Based Prognostic Factors of Colorectal Cancers are Associated with the State of the Local Immune Reaction", *J Clin Oncol.* 2011, 29(6):610-618.

What is claimed is:

1. A method for quantitative assessment of a patient-specific immune system state in tumor tissue and other relevant tissue compartments for evaluating a potential or ongoing treatment, the method comprising:
   preparing one or more tissue sections and respective histologic slides from a tissue sample at least partially containing tumor cells,
   staining said slides with at least:
      a first stain for identifying cells within the tissue sections, and
      a second stain for identifying inflammatory cells, inflammatory modulators, or a combination thereof;
   obtaining digital images of the stained slides;
   for each of said digital images:
      detecting cells within the digital image;
      extracting cell features, cell population features, or a combination thereof to assemble cell-based data,
      representing the cell-based data with interactive computer-generated visualization;
      dividing the detected cells into one or more tissue compartments based on the extracted cell data;
      selecting one of the tissue compartments for further analysis; and within the selected tissue compartment, identifying inflammatory cells, cells expressing an inflammatory modulator marker, or a combination thereof to assemble tissue compartment data;

the method further comprising:
storing the cell-based data and tissue compartment data in one or more databases for comparative analysis;
deriving an immune system state score based on analysis of the cell-based data and tissue compartment data;
using at least the immune system state score to stratify a patient into one or more treatment stratification groups; and
selecting a particular therapy, treatment efficacy or treatment toxicity level for the patient based on the treatment stratification group.

2. The method of claim 1, wherein said one or more tissue sections are obtained from biopsy, excision, or surgical specimens.

3. The method of claim 2, wherein said one or more tissue sections comprise: a single tissue section, a plurality of tissue sections, multiple serial tissue sections, or multiple sets of multiple serial tissue sections for each study sample.

4. The method of claim 1, wherein said staining said slides includes the application of one or a combination of stains for identifying: inflammatory cell types, inflammatory modulators, proliferating cells, cells undergoing apoptosis, cell nuclei, or a combination thereof.

5. The method of claim 1, wherein said cell features comprise: cell morphology, staining characteristics, cell neighborhood characteristics, cell distribution within the tissue, or a combination thereof.

6. The method of claim 1, wherein the cell population features comprise: regional or tissue wide cell feature characteristics, percentage of cell sub-type with respect to the total number of cells, quantity of cell subtype per total cells or tissue area, quantity of cell subtype per tissue volume, statistics of cell features, cell type distribution pattern, cell type localization relative to other cell types, and cell type localization relative to tissue features.

7. The method of claim 1, wherein said extracting cell features, cell population features, or a combination thereof to assemble cell-based data comprises assigning numeric values correlating the cell features and cell population features.

8. The method of claim 1, wherein said extracting cell features, cell population features, or a combination thereof to assemble cell-based data provides univariate, bivariate, and multivariate analysis for interpretation, data mining and visualization.

9. The method of claim 1, wherein the selected tissue compartment is stratified based on cell features to generate a regional annotation around the tissue compartment, or to select only those cells in the tissue compartment of interest, for said further analysis.

10. The method of claim 9, wherein the defined regional annotation is manipulated to identify a subset or adjacent area of tissue for analysis.

11. The method of claim 1, wherein the immune system state score is derived by prospectively selecting parameters from analyses of cell features or cell population features and combining the numeric values from said parameters to create a single numeric immune system state score.

12. The method of claims 11, wherein the immune system state score is derived using the cell-based data and tissue compartment data associated with a plurality of tissue sections of the tissue sample.

13. The method of claim 1, wherein a pre-stratified training set of patient-data is used to select the parameters that optimally describe an immune system state score from those parameters encompassed in the cell-based data.

14. The method of claim 13, wherein the cell based data and cell compartment data used to derive the immune system state score is measured from one or more tissue sections stained with one or more stains.

15. The method of claim 1, wherein a patient stratification scheme is based on defining selection criteria for the immune system state score.

16. The method of claim 15, wherein the stratification criteria based on the immune system score is used to select, or exclude, the patient as a candidate for a specific cancer therapy.

17. The method of claim 1, wherein the immune system state score is used to monitor efficacy or toxicity of patient responses to a therapeutic approach.

18. The method of claim 1, wherein the immune system state score is further used to define an in vitro multiplex diagnostic assay (IVMDA) using manual and machine learning techniques.

19. The method of claim 1, wherein said computer-generated visualization comprises: an interactive linkage between data and display, one or more image overlays, one or more heat maps, one or more data plots, 3D display of aligned images, fused images from aligned images, mapped cell data, image overlays of mapped cell data onto an image from a different tissue section, or any combination thereof.

20. The method of claim 1, wherein the tissue is from a research animal and the immune system state score derived for a study cohort is used to guide pre-clinical development of a pharmaceutical compound or medical device.

* * * * *